Aug. 18, 1936.  C. L. FLINDT  2,051,333
SOLE TRIMMING MACHINE
Filed June 29, 1935
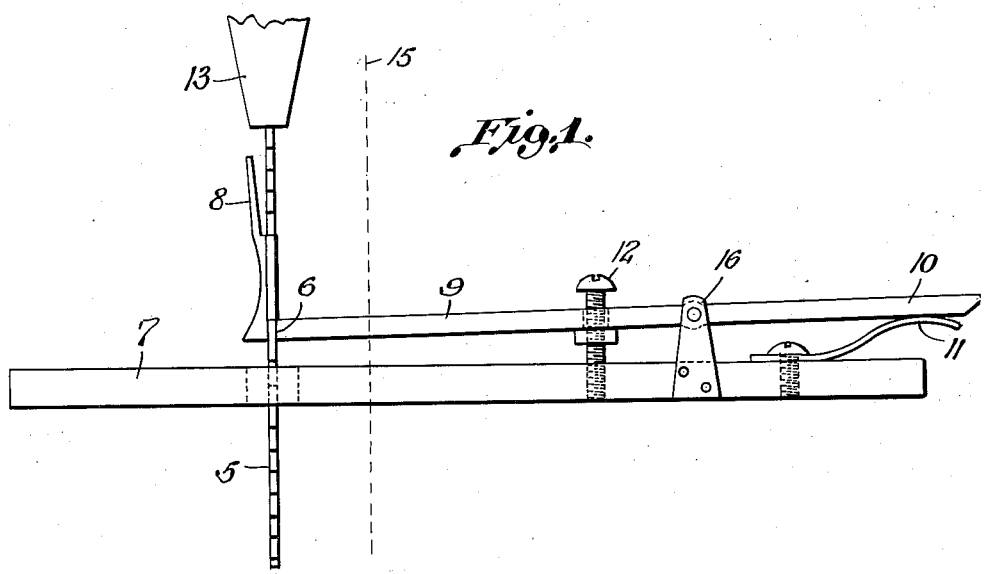
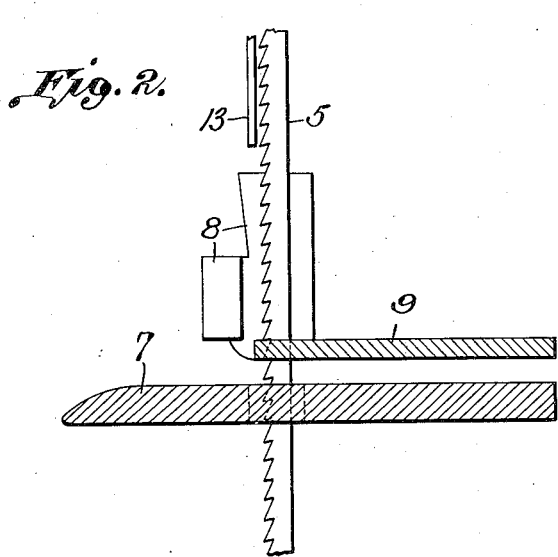
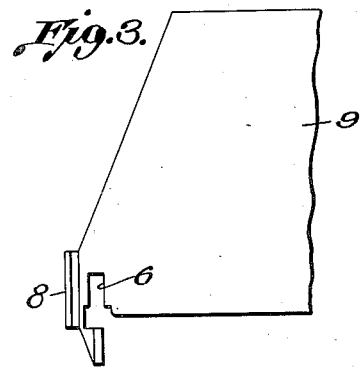
Inventor:
Charles L. Flindt Patented Aug. 18, 1936

2,051,333

UNITED STATES PATENT OFFICE 2,051,333

SOLE TRIMMING MACHINE

Charles L. Flindt, San Jose, Calif.

Application June 29, 1935, Serial No. 29,067

3 Claims. (Cl. 12—85)

This invention is useful for trimming the sole of a shoe preparatory to its introduction to the stitcher for sewing and is equally valuable for trimming up after the stitching has been done. The combination of parts claimed herein is for attaching to an ordinary jig saw or band saw; the former being preferable for the reason that the cost of the saw is less on account of its short length, and also of the fact that the upward movement of the saw after the downward cutting stroke operates to lift the sole slightly, because of a slight set of the teeth of the saw; this feature enables the operator of the machine to feed the work with less resistance and consequently secures easier action.

The general object of this invention is to provide a simple and inexpensive means for trimming soles of shoes and has for its principal use the shoe repair trade. Figure 1 is a front view of the improvements. Figure 2 is a side view cut at line 15 of Figure 1, and Figure 3 is a top view of plate 9.

In Figure 1 of the drawing, the saw 5, (mountings not shown) passes through saw guide 6 (Figure 3), which fits the blade of the saw back of the teeth; this guide is of course tempered to a very hard degree to resist the wear of friction with the saw and operates to insure accurate cutting at all times. The saw also passes through a hole in the table or plate 7, which can also fit the saw and serve as a guide therefor, but I prefer the guide as indicated and a larger hole in the said plate allowing of plenty of clearance for the saw.

A very essential part of this invention is the guard 8 which protects the upper of the shoe from possible injury by the saw. This is especially necessary when trimming in the shanks of the shoe. The said guard is a part of the saw guide plate 9 which contains the guide 6, and rests on the welt of the shoe at its lower end when the shoe is inserted under it on the plate or table 7, by the operator pressing down on arm 10. This arm by action against spring 11, enables a uniform pressure on the welt by the guard 8, conforming automatically to accommodate the different thicknesses of soles when released by the operator.

The check screw 12 controls the limits of motion up and down, of the saw guide plate 9 which fulcrums around pin 16; the safety guard 13 can be suitably attached to the framework of the machine and serves merely as a safety device to protect the operator.

In Figure 3 is will be seen that the guard 8 extends around in front of the saw and protects both the upper of the shoe and the operator of the machine from possible injury. The front point of this guard indicates the track the saw will take as it is in line with the cutting edge of the saw and the operator, by holding the shoe with the said point directly over the edge of the welt, insures that the trimming will be flush with the edge of the welt.

Having thus described my invention what I claim as new and desire to secure by Letters Patent is:

1. The combination in a sole trimming machine, of a table or plate for supporting the sole of a shoe while trimming it, a saw for cutting the said sole, a guide suitably mounted contacting the sides of the saw to engage it when it is in operation to prevent bending thereof from true course and promote accuracy in cutting, and means for protecting the upper of the shoe from possible injury by the teeth of the saw as it operates.

2. The combination in a sole trimming machine, of a saw, a table or plate for supporting the sole of a shoe while trimming it, means contacting the saw and suitably mounted to engage the blade thereof when same is in motion to guide it and prevent bending thereof from true course to thereby promote accuracy of action, means for protecting the upper of the shoe from possible injury by the saw, and means for maintaining a yielding pressure on the welt of the shoe as the sole is being trimmed conforming automatically to accommodate the different thicknesses of soles and hold the sole and welt together, thereby facilitating the work of the saw.

3. The combination in a sole trimming machine, of a saw, a table or plate for supporting the sole of a shoe while trimming it, means contacting the saw and suitably mounted to engage the blade thereof when same is in motion to guide it and prevent bending thereof from true course to thereby promote accuracy of action, means protecting the upper of the shoe from possible injury by the saw, means for maintaining a yielding pressure on the welt of the shoe conforming automatically to accommodate the different thicknesses of soles and holding the welt and sole together during the trimming operation, means for releasing the said yielding pressure when introducing or removing the sole to or from the saw, and a safety guard protecting the operator of the saw from possible accidental injury to himself.

CHARLES L. FLINDT.